United States Patent Office 3,835,098
Patented Sept. 10, 1974

3,835,098
PROCESS FOR IMPROVING THERMOPLASTIC ELASTOMERIC COMPOSITIONS
Morton Brown, Guenther Kurt Hoeschele, and William Kenneth Witsiepe, Wilmington, Del., assignors to E. I. du Pont de Nemours and Company, Wilmington, Del.
No Drawing. Continuation-in-part of abandoned application Ser. No. 120,376, Mar. 2, 1971. This application Mar. 1, 1973, Ser. No. 337,014
Claims priority, application Canada, Dec. 9, 1971, 129,803
Int. Cl. C08g 17/14, 23/20
U.S. Cl. 260—75 N    12 Claims

ABSTRACT OF THE DISCLOSURE

A process for preparing a thermoplastic elastomeric copolyester composition having improved elastomeric, physical and stability properties which comprises comingling and reacting an effective amount of at least one polycarbodiimide selected from substantially linear polycarbodiimides having an average of at least two carbodiimide groups per molecule with at least one elastomeric segmented copolyester polymer comprising (1) 5–90 weight percent long chain ester units derived from at least one long chain glycol having a molecular weight of about 400–6000 and at least one low molecular weight dicarboxylic acid having a molecular weight less than about 300, and (2) 10–95 weight percent short chain ester units derived from at least one low molecular weight diol having a molecular weight of less than about 250 and at least one low molecular weight dicarboxylic acid having a molecular weight of less than about 300.

RELATED APPLICATION

This application is a continuation-in-part of U.S. Ser. No. 120,376, filed Mar. 2, 1971, and now abandoned.

Certain thermoplastic elastomeric copolyesters exhibit good physical properties in general and are readily processed by procedures regularly employed for thermoplastic materials. These polymers are essentially linear. They can be prepared by esterification (or transesterification) followed by polycondensation of mixtures of dicarboxylic acids (or their esters), long chain polymeric glycols and excess low molecular weight diols in suitable proportions.

Many of the properties of these copolyesters are relatively insensitive to changes in molecular weight, but some important properties including tensile strength, tear strength, abrasion resistance, and flex cut growth resistance improve steadily with increasing molecular weight. While it is possible to prepare these copolyesters in high molecular weights by known procedures, expensive continuous polycondensation equipment which is capable of handling high viscosity polymer melt is required. However, the output of the equipment is limited because of the long finishing times required to reach a high degree of polymerization. In addition, operating errors can result in the production of copolyesters having molecular weights lower than desired.

Thus, there is a need for a process for preparing improved thermoplastic elastomeric copolyesters having properties which approach those of copolyesters having high molecular weights without encountering the difficulties associated with the preparation of high molecular weight thermoplastic elastomeric copolyesters by polycondensation.

It has been found that reaction of intermediate molecular weight thermoplastic elastomeric copolyesters with minor but effective amounts of a polycarbodiimide provide compositions exhibiting properties quite similar to those exhibited by copolyesters of a higher degree of polymerization. While it is known that carboxyl group-containing polymers can be vulcanized by addition of polycarbodiimides to form cross-linked materials ranging from gels to tough elastomers, the improvements observed in the composition of the present process are surprising because the thermoplastic character of the copolyesters is retained and the compositions process as though they were linear. The improved properties of the compositions resulting from the process are further surprising in that the original linear copolyesters are not simply carboxyl terminated, but have terminal hydroxyl groups as well. In many instances, there is a preponderance of hydroxyl groups. Even in those copolyesters where carboxyl groups predominate, the concentration of carboxyl groups is preferably below that considered a minimum by the prior art for vulcanization of carboxyl group-containing polymers. The improved copolyester compositions prepared by the process of this invention also exhibit improved heat aging characteristics and hydrolytic stability when compared with copolyesters having a similar molecular weight obtained directly by prolonged polycondensation.

By this invention there is provided a process for preparing improved thermoplasitc elastomeric copolyester compositions having good physical properties characteristic of copolyesters having higher molecular weights. The process provides compositions exhibiting good stability under severe thermal or hydrolytic conditions.

The process of this invention consists essentially of reacting an effective amount of at least one polycarbodiimide selected from substantially linear polycarbodiimides having an average of at least two carbodiimide groups per molecule with at least one elastomeric segmented copolyester polymer comprising (1) 5–90 weight percent long chain ester units or segments derived from at least one long chain glycol having a molecular weight of about 400–6000 and at least one low molecular weight dicarboxylic acid having a molecular weight less than about 300, and (2) 10–95 weight percent short chain ester units derived from at least one low molecular weight diol having a molecular weight of less than about 250 and at least one low molecular weight dicarboxylic acid having a molecular weight of less than about 300.

By this invention there is provided a process comprising the comingling and reacting of (A) an effective amount of at least one substantially linear polycarbodiimide represented by the formula

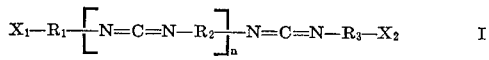    I where $R_1$, $R_2$, and $R_3$ are $C_1$–$C_{12}$ aliphatic, $C_6$–$S_{15}$ cycloaliphatic, or $C_6$–$c_{15}$ aromatic divalent hydrocarbon radicals, and combinations thereof; $X_1$ and $X_2$ are

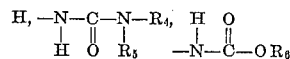

where $R_4$, $R_5$, and $R_6$ are $C_1$–$C_{12}$ aliphatic, $C_5$–$C_{15}$ cycloaliphatic and $C_6$–$C_{15}$ aromatic monovalent hydrocarbon radicals and combinations thereof and additionally $R_4$ or $R_5$ can be hydrogen; and $n$ is a number of at least 1, preferably 1–7, with (B) at least one segmented copolyester polymer, said copolyester polymer consisting essentially of recurring intralinear long chain ester units and short chain ester units randomly joined head-to-tail through ester linkages, said long chain ester units being represented by the formula

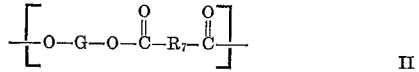    II and said short chain ester units being represented by the formula

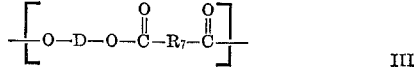    III where G is a divalent radical remaining after the removal of terminal hydroxyl groups from at least one long chain glycol having a molecular weight of about 400–6000; $R_7$ is a divalent radical remaining after removal of carboxyl groups from at least one dicarboxylic acid having a molecular weight less than about 300; and D is a divalent radical remaining after removal of hydroxyl groups from at least one low molecular weight diol having a molecular weight less than 250.

Polycarbodiimides which can be used in the process of this invention are polycarbodiimides having an average of at least two carbodiimide groups (i.e. two —N=C=N— groups) per molecule and an average molecular weight of less than about 500 per carbodiimide group. These polycarbodiimides can be aliphatic, cycloaliphatic, or aromatic polycarbodiimides. The terms aliphatic, cycloaliphatic, and aromatic as used herein indicate that the carbodiimide group is attached directly to an aliphatic group, a cycloaliphatic group, or an aromatic nucleus respectively. For example, these carbodiimides can be illustrated by the formula

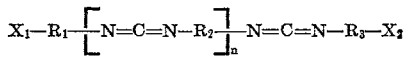

wherein $R_1$, $R_2$, and $R_3$ are independently aliphatic, cycloaliphatic, or aromatic divalent hydrocarbon radicals and $n$ is at least 1 and preferably 1–7. $X_1$ and $X_2$ are defined as hereinbefore. Polycarbodiimides useful for the compositions of this invention have more than two polycarbodiimide groups and thus more than three divalent hydrocarbon groups (i.e. $R_1$, $R_2$, $R_3$ ... $R_n$) and each of these hydrocarbon groups can be the same or different from the others so that the polycarbodiimides can have aliphatic, cycloaliphatic, and aromatic hydrocarbon groups in one polycarbodiimide molecule.

While all of the above polycarbodiimides can be used to prepare the improved copolyester compositions resulting from the process of this invention, aromatic polycarbodiimides are preferred. By selecting a copolyester polymer having the desired ester units and molecular weight and a polycarbodiimide having desired property-improving and stabilizing effects (or mixtures of copolyesters and mixtures of polycarbodiimides), thermoplastic elastomeric copolyester compositions can be prepared which have optimum elastomeric and other physical properties at minimum expense.

Polycarbodiimides useful in the process of this invention can have substituents which do not substantially interfere with the process or adversely affect the properties of the resulting compositions, such as stability and elastomeric characteristics to any substantial degree. Aromatic polycarbodiimides having relatively inert substituents (such as alkyl, cycloalkyl, aryl, alkaryl, aralkyl, alkoxyl, aryloxy, and halo) in one or both ortho positions adjacent to substantially all C—N bonds linking an aromatic nucleus to a carbodiimide group will be referred to herein as hindered polycarbodiimides. This is in contrast to polycarbodiimides which do not have ortho substituents or are only partially ortho substituted which will be referred as unhindered aromatic polycarbodiimides. While both hindered and unhindered aromatic polycarbodiimides are useful in improving the properties of the copolyesters contemplated, unhindered polycarbodiimides are generally more effective in terms of the extent of property improvements obtained. This is particularly true for copolyesters in which initially a large proportion of the terminal groups are hydroxyl groups. In the case of copolyesters in which the terminal groups are predominately carboxyl groups, hindered carbodiimides provide property improvements approaching those observed with unhindered polycarbodiimides.

Polycarbodiimides can be prepared for use in this invention by well-known procedures. Typical procedures are described in U.S. Pats. 3,450,562 to Hoeschele; 2,941,983 to Smeltz; 3,193,522 to Neumann et al.; and 2,941,966 to Campbell.

Generally, polycarbodiimides are prepared by polymerization of organic diisocyanates. The isocyanate groups on a diisocyanate molecule polymerize with isocyanate groups on other diisocyanate molecules so that the resulting polycarbodiimide molecule is a linear polymer of organic radicals (i.e. alphatic, cycloaliphatic, aromatic, or combinations thereof) linked together by carbodiimide groups (i.e. —N=C=N—). The degree of polymerization and the specific diisocyanate determine the molecular weight of the polycarbodiimide and the average molecular weight per carbodiimide group.

Many known organic isocyanates can be polymerized to produce polycarbodiimides useful for stabilized compositions of this invention. Isocyanates which can be polymerized to produce preferred aromatic polycarbodiimides include:

tolylene-2,4-diisocyanate,
tolylene-2,6-diisocyanate,
α,4-tolylene diisocyanate,
1,3- and 1,4-phenylene diisocyanates,
4,4'-methylenebis(phenyl isocyanate),
5-chlorotolylene-2,4-diisocyanate,
1,5-naphthylene diisocyanate,
1,6-hexamethylene diisocyanate,
4,4'-methylenebis(cyclohexyl isocyanate),
1,3- and 1,4-cyclohexylene diisocyanates,
1,3-diisopropylphenylene-2,4-diisocyanate,
1-methyl-3,5-diisopropylphenylene-2,4-diisocyanate,
1,3,5-triethylphenylene-2,4-diisocyanate,
triisopropylphenylene-2,4-(2,6-)diisocyanate.

Diisocyanates, such as tolylene-2,4-diisocyanate or mixtures thereof with minor amounts of tolylene-2,6-diisocyanate and 4,4'-methylenebis(phenyl isocyanate), can be used to produce preferred unhindered aromatic polycarbodiimides which have only partial ortho substitution on the aromatic nuclei to which polycarbodiimine groups are attached. Diisocyanates such as triisopropylphenylene-1,3-diisocyanate yield preferred hindered aromatic polycarbodiimides.

Polymerization of diisocyanates to produce polycarbodiimides of a given degree of polymerization can be controlled by introducing agents which will cap the terminal isocyanate groups. These agents include monoisocyanates and active hydrogen compounds such as alcohols or amines. Polyisocyanates and other agents which will produce cross-linking of the polycarbodiimide generally should be avoided as cross-linking can reduce solubility and lead to blending problems with the copolyester. Preferably, isocyanate polymerization should be stopped to produce polycarbodiimides having average molecular weights in the range of about 600–2500 and 2–8 carbodiimide linkages. Polycarbodiimides in this preferred range can be readily mixed with copolyester and are sufficiently nonvolatile to prevent loss by vaporization.

The average number of carbodiimide groups per molecule can be estimated for a given polycarbodiimide from the proportions of the reactants employed in its preparation. As described elsewhere, the degree of polymerization of the polycarbodiimide can be controlled by employing capping agents. Alternatively, the average number of carbodiimide groups per molecule in a given polycarbodiimide can be calculated from its molecular weight (obtained by vapor phase osmometry or ebulliscopic procedures) and its assay for carbodiimide groups [determined by the method of Campbell and Smeltz, J. Org. Chem., 28, 2069–2075 (1963)].

Segmented copolyester polymers useful in the process of this invention are composed of (1) long chain ester units or segments derived from reaction of a substantially linear polymeric glycol and an aliphatic, cycloaliphatic or aromatic dicarboxylic acid, and (2) short chain ester units or segments derived from reaction of a low molecular weight aliphatic, cycloaliphatic, or aromatic diol and an aliphatic, cycloaliphatic, or aromatic dicarboxylic acid. More than one type of dicarboxylic acid, more than one type of diol, and more than one type of glycol can be used to produce the above copolyester polymer. Use of more than one type of any of the three types of reactants, i.e. glycol, diol, and dicarboxylic acid, will produce a polymer having as many types of ester units as there are combinations of acid and glycol or acid and diol. Useful copolyester polymers must have at least 10 weight percent of short chain and at least 5 weight percent long chain ester units for acceptable elastomeric properties.

Segmented copolyester polymers useful in this invention are produced by reacting together in a mixture at least one long chain glycol, at least one low molecular weight diol, and at least one dicarboxylic acid. The long chain ester units are segments of the copolyester chain which are the reaction product of the long chain gylcol and the dicarboxylic acid. The short chain ester units are segments of the copolyester chain which is the reaction product of the low molecular weight diol and the dicarboxylic acid. The reaction is conducted by conventional methods and conditions. The short chain ester units should be chosen so that a polymer made up solely of short chain ester units and having a molecular weight in the fiber-forming range (>5000), has a melting point of at least 150° C. The melting point is determined by extinction of polarized light observed while the sample is heated on a hot stage microscope substantially by the procedure described in "Preparative Methods of Polymer Chemistry," Sorenson and Campbell, Interscience Publishers, Second Edition, 1968, pages 53–55. The melting point is the average of the temperatures at which the first and last sample particles blend with the background while heating at 1° C./minute after first annealing the sample for 30 minutes at a temperature about 20° C. below the approximate melting point.

Generally, the long chain and the short chain units combine to form the copolyester polymer according to their tendencies to react under the conditions used. This order of combination can be termed random or statistical. The various ester units are combined in a head-to-tail arrangement through ester linkages forming a substantially intralinear polymer. The exact polymer chain configuration is not critical as long as the various reactant and proportion parameters are met.

Copolyester polymers useful in this invention have 5–90 weight percent long chain ester units and at least 50 mole percent of the total short chain ester units of the same type, i.e. derived from one type of acid and one type of low molecular weight diol. In addition, preferred copolyester polymers have a carboxyl group content of less than about 50 equivalents per million grams of polymer. Copolyesters having carboxyl contents in excess of 50 equivalents per million grams may on occasion degrade to such an extent that they appear to contain non-reactive end groups as well as hydroxyl and carboxyl end groups. As a result, they may not give property improvements to the full extent observed for preferred compositions of this invention. Preferred copolyester polymers also have an inherent viscosity of about 0.75 to 1.7 prior to addition of the polycarbodiimide. Copolyesters having inherent viscosities below about 0.75 yield low elongation at break and low tensile strength compositions which appear to be cross-linked. Copolyesters having inherent viscosities above about 1.7 show only limited property improvement in the process of this invention. Copolyesters having inherent viscosities of about 1.0–1.3 are especially preferred for use in the process of this invention. These inherent viscosities are determined by the method described hereinafter.

Copolyester polymers useful in this invention can be conveniently made by conventional ester interchange reaction. A preferred procedure involves heating at about 150–260° C. the dimethyl ester of a dicarboxylic acid with a long chain glycol and a molar excess of a short chain diol in the presence of an ester interchange catalyst. Methanol formed by the interchange reaction is distilled off and heating is continued until methanol evolution is completed. The interchange reaction or polymerization is typically complete within a few minutes to a few hours depending upon the particular temperature, catalyst, glycol excess, and reactants used. This procedure produces a low molecular weight prepolymer which can be transformed into high molecular weight copolyester by additional ester interchange as described herein.

Low molecular weight ester prepolymer can be prepared by other ester interchange procedures. A long chain glycol can be reacted with a high or low molecular weight short chain ester homopolymer or copolymer in the presence of ester interchange catalyst until a random ester prepolymer is produced by the interchange reaction. Short chain ester homopolymer or copolymer can be prepared by ester interchange from either dimethyl esters and low molecular weight diols, as above, or from free acids with diol acetates. Short chain ester copolymer can be prepared by direct esterification of appropriate acids, anhydrides, or acid chlorides with diols or alternatively by reaction of the acids with cyclic ethers or carbonates. Ester prepolymer can also be prepared by using a long chain glycol in place of a diol or using a mixture of reactants.

Molecular weight of the ester prepolymer is increased by removing excess short chain diol by distilling it from the prepolymer. This operation is frequently referred to as "polycondensation." Additional ester interchange occurs during the distillation to increase the molecular weight and to further randomize the arrangement of the copolyester units. The distillation conditions typically are less than 1 mm. Hg, at 220–280° C. Antioxidants, such as sym-di-beta-naphthyl-p-phenylene-diamine and 1,3,5 - trimethyl - 2,4,6 - tris(3,5 - ditertiary-butyl-4 hydroxybenzyl) benzene can be added to reduce degradation.

To increase the rate of ester interchange catalysts can be employed for the prepolymer and polycondensation steps. Any one of a wide variety of well-known catalysts can be used, but organic titanates, such as tetrabutyl titanate either alone or combined with magnesium or zinc acetates, are preferred. Complex titanates derived from alkali or alkaline earth metal alkoxides and titanate esters are very effective. Inorganic titanates (such as lanthanum titanate), calcium acetate/antimony trioxide mixtures, and lithium and magnesium alkoxides are other catalysts which can be used.

Ester interchange polymerizations are generally run in a melt without added solvent, but inert solvent can be used to facilitate removal of volatile components from the mass at low temperatures. Other special processing techniques, such as azeotropic distillation using a solvent to prepare prepolymer and interfacial polymerization, can be used for specific polymers and problems. Both batch and continuous methods can be used for any stage of copolyester polymer preparation. Polycondensation of prepolymer can also be accomplished in the solid phase by heating finely divided solid prepolymer in a vacuum or in a stream of inert gas to remove liberated low molecular weight diol. This method has the advantage of reducing degradation because it must be used at temperatures below the softening point of the prepolymer. The major disadvantage is the long time required to reach a given degree of polymerization.

Long chain glycols which can be used to produce the copolyester polymers are substantially linear glycols having hydroxy groups on the chain which are terminal, or as nearly terminal as possible, and having a molecular weight of above about 400 and preferably 400–6000.

A preferred group of long chain glycols have a melting point of less than about 60° C. and a carbon to oxygen ratio of at least about 2.0. These preferred glycols produce compositions having good resistance to hydrolysis.

Long chain glycols which can be used to prepare copolyester polymers useful in this invention include poly(alkylene oxide)glycols wherein the alkylene group has 2–9 carbon atoms, such as poly(ethylene oxide)glycol,
poly(1,2- and 1,3-propylene oxide)glycol,
poly(tetramethylene oxide)glycol,
poly(pentamethylene oxide)glycol,
poly(hexamethylene oxide)glycol,
poly(heptamethylene oxide)glycol,
poly(octamethylene oxide)glycol,
poly(nonamethylene oxide)glycol, and
poly(1,2-butylene oxide)glycol;

random or block copolymers of ethylene oxide and 1,2-propylene oxide, and poly-formals prepared by reacting formaldehyde with glycols, such as pentamethylene glycol, or mixtures of glycols, such as a mixture of tetramethylene and pentamethylene glycols.

Polyether glycols and polyester glycols can also be used as the glycols for producing copolyester polymers. With polyester glycols care must generally be exercised to reduce tendency of such glycols to interchange during polymerization. Either polybutadiene or polyisoprene glycols, copolymers of these, and saturated hydrogenation products of these materials can be used as long chain glycols herein. Glycol esters of dicarboxylic acids formed by oxidation of polyisobutylene diene copolymers can also be used as glycols for the copolyester polymers useful in this invention.

Poly(tetramethylene oxide)glycol, poly(ethylene oxide)glycol, poly(1,2 - propylene oxide)glycol, and poly(1,2-propylene oxide)glycol capped with ethylene oxide units are preferred long chain glycols.

Dicarboxylic acids which can be used to produce useful copolyester polymers are aliphatic, cycloaliphatic, or aromatic dicarboxylic acids of a low molecular weight, i.e. having a molecular weight of less than about 300. Dicarboxylic acids, as used herein, include acid equivalents having two functional carboxyl groups which perform substantially like dicarboxylic acids in reaction with glycols and diols forming copolyester polymers. These equivalents include esters, ester-forming derivatives, such as acid halides and anhydrides, and other derivatives which behave substantially like dicarboxylic acids forming esters with glycols and diols. The molecular weight requirement pertains to the acid and not to its equivalent, ester or ester-forming derivative. Thus, an ester of a dicarboxylic acid having a molecular weight greater than 300 or an acid equivalent of a dicarboxylic acid having a molecular weight greater than 300 are included provided the acid has a molecular weight below about 300. The dicarboxylic acids can contain any substituent groups or combinations which do not substantially interfere with the copolyester polymer formation and use of the polymer in the process of this invention.

Aliphatic dicarboxylic acids, as the term is used herein, refers to carboxylic acids having two carboxyl groups each attached to a saturated carbon atom. If the carbon atom to which the carboxyl group is attached is saturated and is in a ring, the acid is cycloaliphatic. Aliphatic or cycloaliphatic acids having conjugated unsaturation cannot be used because such acids do not satisfactorily form the copolyester polymers necessary for the stabilized compositions of this invention, but acids having unsaturation which is not conjugated can be used.

Aromatic dicarboxylic acids, as the term is used herein, are dicarboxylic acids having two carboxyl groups attached to a carbon atom in an isolated or fused benzene ring. It is not necessary that both functional carboxyl groups be attached to the same aromatic ring and where more than one ring is present, they can be joined by aliphatic or aromatic divalent radicals or divalent radicals such as —O— or —SO$_2$—.

Representative aliphatic and cycloaliphatic acids which can be used for this invention are sebacic acid, 1,3-cyclohexane dicarboxylic acid, 1,4-cyclohexane dicarboxylic acid, adipic acid, glutaric acid, succinic acid, carbonic acid, oxalic acid, azelaic acid, diethylmalonic acid, allylmalonic acid, 4-cyclohexene-1,2-dicarboxylic acid, 2-ethylsuberic acid, 2,2,3,3-tetramethylsuccinic acid, cyclopentanedicarboxylic acid, decahydro-1,5-naphthylene dicarboxylic acid, 4,4'-bicyclohexyl dicarboxylic acid, decahydro-2,6-naphthylene dicarboxylic acid, 4,4'-methylene-bis(cyclohexyl carboxylic acid, 3,4 - furan dicarboxylic acid, and 1,1-cyclobutane dicarboxylic acid. Preferred aliphatic acids are cyclohexanedicarboxylic acids and adipic acid.

Representative aromatic dicarboxylic acids which can be used include phthalic, terephthalic, and isophthalic acids, bibenzoic acid, substituted dicarboxy compounds with two benzene nuclei such as bis(p-carboxyphenyl)methane, p-oxy(p-carboxyphenyl) benzoic acid, ethylene-bis(p-oxybenzoic acid), 1,5-naphthalene dicarboxylic acid, 2,6-naphthalene dicarboxylic acid, 2,7-naphthalene dicarboxylic acid, phenanthralene dicarboxylic acid, anthralene dicarboxylic acid, 4,4'-sulfonyl dibenzoic acid, $C_1$–$C_{12}$ alkyl and ring substitution derivatives thereof, such as halo, alkoxy, and aryl derivatives. Hydroxyl acids such as p-(β-hydroxyethoxy) benzoic acid can also be used providing an aromatic dicarboxylic acid is also present.

Aromatic dicarboxylic acids are a preferred class for preparing the copolyester polymers useful in this invention. Among these aromatic acids those with 8–16 carbon atoms are preferred, particularly the phenylene dicarboxylic acids, i.e., phthalic, terephthalic, and isophthalic acids.

Low molecular weight diols which can be used are aliphatic, cycloaliphatic, and aromatic diols having a molecular weight of less than about 250 and two functional hydroxyl groups. Diol equivalents which form esters with dicarboxylic acids are included and the molecular weight requirement applies only to the diol and not to its equivalent. Such equivalents are illustrated by ethylene oxide and ethylene carbonate which can be used in the place of ethylene glycol. However, ethylene glycol cannot be used as the low molecular weight diol when all or part of the dicarboxylic acid is an aliphatic acid because of the relatively poor hydrolytic stability of copolyesters containing such short chain ester units.

The terms aliphatic, cycloaliphatic, and aromatic as used to define the diols useful for this invention have the same general meaning as applied to the dicarboxylic acids and glycols set forth herein with the location of the functional hydroxyl groups being the determining factor similar to the location of the carboxyl groups for the dicarboxylic acids.

Preferred low molecular weight diols useful in the process of this invention include diols having 2–15 carbon atoms such as ethylene, 1,2- or 1,3-propylene, isobutylene, tetramethylene, pentamethylene, 2,2 - dimethyltrimethylene, hexamethylene, and decamethylene glycols, dihydroxy cyclohexane, cyclohexane dimethanol, hydroquinone-bis (β-hydroxyethyl)ether resorcinol, hydroquinone, 1,5-dihydroxy naphthalene, etc. Especially preferred are aliphatic diols containing 2–8 carbon atoms. Bis-phenols, such as bis(p-hydroxy) diphenyl, bis(p-hydroxyphenyl) methane and bis(p-hydroxyphenyl)propane can be used.

The process of this invention can be carried out by thoroughly mixing at least one segmented copolyester polymer, as described herein, with an effective amount of substantially linear polycarbodiimide, as described herein. For best results, the two components must be thoroughly and uniformly blended, otherwise localized areas will differ in properties. The process can be carried out by adding the polycarbodiimide to copolyester which has been heated to a temperature sufficient to soften or melt the copolyester and agitating until the polycarbodiimide is incorporated. The temperature required to soften or melt the copolyester depends on the particular copolyester, but generally will be in the range of 150–280° C. Generally, it is preferred to use the lowest temperature which will permit the means of agitation available to be effective. For example, if agitation is limited to that provided by a close-fitting paddle stirrer in a kettle, the copolyester will have to be heated somewhat above its melting point to lower its viscosity. If more powerful agitation is available, such as that provided by heated rubber mills, internal mixers (Banbury mixer) or a twin barrel extruder, temperatures near the softening point or melting point of the copolyester can be used. If desired, solvents or plasticizers can be used to assist in mixing the polycarbodiimide with the copolyester at lower temperatures. A particularly convenient procedure consists of dry blending the polycarbodiimide with the copolyester in granular or pellet form and incorporating the polycarbodiimide into the copolyester in an extruder or injection molding machine at the time the copolyester is being used to prepare extruded or molded goods. In place of dry blending, one can coat the divided particles of copolyester with molten polycarbodiimide or a solution of polycarbodiimide in a solvent or plasticizer to extruding or injection molding.

The interaction of the polycarbodiimide and the copolyester usually is substantially completed in the course of the mixing operations. Additional minor improvements in physical properties can, however, occasionally to achieve by exposing the mixture to elevated temperatures of 50–150° C. for 30 minutes to 100 hours with shorter times being used with the higher temperatures. This heating step is not essential. As used herein, "effective amount" indicates the amount of polycarbodiimide necessary to produce a composition with a particular copolyester (or copolyesters) and a particular polycarbodiimide (or polycarbodiimides) which exhibits significant improvement in properties such as tensile and tear strengths relative to the original copolyester. Accompanying these improvements is a significant increase in inherent viscosity which reflects an increase in the average molecular weight of the copolyester composition relative to the starting copolyester. For most systems, an effective amount of polycarbodiimide will range from 0.1–5.0 percent by weight of the total mixture. Generally, 0.2–3.0 percent is preferred in most applications.

As previously indicated, the physical properties of the compositions resulting from the process of the present invention match or even exceed the properties of higher molecular weight thermoplastic elastomeric copolyesters. Copolyesters which do not have the proper processing characteristics for extrusion or injection molding because of low melt viscosity can be readily upgraded. The difficulties associated with the manufacture of higher molecular weight copolyesters having very high melt viscosities under process conditions can be avoided by means of this invention. Higher production rates can be achieved in existing polyester equipment by producing polymers of intermediate molecular weight. Facilities which are borderline for preparing higher molecular weight copolyesters [such as batch polycondensation kettles or continuous melt condensation equipment used in the manufacture of poly(ethylene terephthalate) staple] can be used to prepare intermediate molecular weight products which are upgraded when used in the present process.

Because of their relatively low melt viscosity (particularly at low shear), rapid hardening rates, excellent flow and mold wetting characteristics, and relative insensitivity to moisture, the compositions resulting from the process of this invention can be processed by substantially all procedures which have been used for thermoplastics in general and, in many instances, these compositions offer significant processing advantage over competitive thermoplastic polymers. The materials can be injection, compression, transfer, and blow molded to form elastic molded articles, which may include inserts, if desired, meeting close tolerances. Their low melt viscosity (which is also characteristic of the unaltered copolyesters) even permits their use in melt casting. They can be readily extruded to produce films (blown or unblown), tubing, other forms having complicated cross sections, and cross-head extruded for hose, wire, cable, and other substrate covers. They can be readily calendered to produce films and sheeting or to produce calender-coat woven and nonwoven fabrics and other substances.

In finely divided form, the products of the process of this invention offer the above-mentioned processing advantages for procedures employing powdered thermoplastics. In such applications a dry blend of polycarbodiimide and copolyester can be used with the reaction taking place at the time of use. In addition, the products of the process of this invention can be used in crumb form. The unique flow characteristics of these materials give excellent definition on molded surfaces and facilitate fusion bonding procedures such as rotational molding (either one or two axis methods), slush molding, and centrifugal molding as well as powder coating techniques such as fluidized bed, electrostatic spray, flame spray, flock coating, powder flow coating, cloud chamber, and heat fused coating (for flexible substrates).

The melt viscosity characteristics of these products offer advantages for use in certain coating and adhesive procedures such as dip, transfer, roller and knife coating, and hot melt adhesives. These same advantages are useful in various combining and laminating operations such as hot roll, web and flame laminating as well as other thermoplastic heat sealing processes. The low melt viscosity of these compositions permits the use of more delicate substrates in combining, laminating, and calendering operations and allows penetration into the substrate if desired.

EXAMPLES

Copolyester A is prepared by ester interchange of 4.84 moles of dimethyl terephthalate hereinafter (DMT), 1.41 moles of dimethyl isophthalate hereinafter (DMI), 1.0 mole of polytetramethyleneether glycol hereinafter (PTMEG–980) (having a number average molecular weight about 980) and excess 1,4-butanediol in the presence of a tetrabutyl titanate/magnesium acetate catalyst and a stabilizer [sym-di-beta-naphthyl-phenylene diamine or 1,3,5 - trimethyl - 2,4,6-tri(3,5-di-tert-butyl-4-hydroxybenzyl)benzene]. Ester interchange is conducted at atmospheric pressure up to a final temperature of 220° C. The ester interchange is followed by polycondensation at 250° C. at less than 1 Torr for about 90 minutes. The resulting polymer has an inherent viscosity of about 1.45–1.55 and contains about 20 equivalents of carboxyl groups per million grams ($10^6$ g.) of polymer.

Copolyester B is prepared by ester interchange of 3.2 moles of DMT, 1 mole of PTMEG–980 and excess 1,4-butanediol using the ester interchange conditions and catalyst and stabilizer described for the prepartion of Copolyester A. Polycondensation is performed at 260° C. for 60 minutes at a pressure of less than 1 Torr. The polymer has an inherent viscosity of 1.45 and a carboxyl content of 23 equivalents/$10^6$ g.

Copolyesters C–1, C–2, and C–3 are prepared by ester interchange of 7.85 moles of DMT, 1 mole PTMEG–980 and excess 1,4-butanediol using the ester interchange conditions and catalyst described for the preparation of Copolyester A. After gradually reducing the pressure over 20 minutes, the polycondensation is conducted at 250° C. and at a pressure of 0.2 Torr for 15 minutes to produce Copolyester C–1 having an inherent viscosity of 0.85 and a carboxyl content of 16 equivalents/$10^6$ g. Copolyesters C–2 and C–3 are obtained by extending slightly the period of polycondensation. Copolyesters C–2 and C–3 have inherent viscosities of 0.91 and 1.04 and carboxyl contents of 17 and 21 equivalents/10⁶ g. respectively.

Polycarbodiimide A is an unhindered aromatic carbodiimide prepared by the following procedure: 112 parts of a mixture containing 80 percent of toluene 2,4-diisocyanate and 20 percent of toluene 2,6-diisocyanate are introduced under dry nitrogen into a clean dry reaction kettle which contains an atmosphere of dry nitrogen and is equipped with an agitator. After the charge has been cooled under dry nitrogen to a temperature below 20° C., 0.43 part of 1-phenyl-3-methyl 3-phospholine-1-oxide catalyst is introduced. Immediately thereafter the nitrogen stream is turned off and measurement of the carbon dioxide evolution is begun. The reaction mixture is slowly warmed to 45° C. over a period of about 5 hours. After 22.3 parts of carbon dioxide have been evolved, 11.90 parts of isopropyl alcohol are immediately added to stop the polycarbodiimide formation. The mixture is then heated to a temperature of 85±2° C. over a period of 2 hours. The melt obtained is discharged and allowed to crystallize at room temperature.

The polycarbodiimide has an average molecular weight of about 800 (corresponding to an average of 4

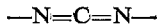

groups) and melts in the range of 80–85° C.

Polycarbodiimide B is a mixture of hindered aromatic polycarbodiimides having an average molecular weight of about 1000. It contains units of the following structure

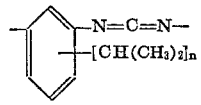

wherein $n$ has an average value of about 3. This polycarbodiimide is sold as "Stabaxol" PCD by Naftone, Inc., New York, N.Y.

Test Procedures

The following ASTM methods are used in determining the properties of the polymers in the examples:

Tensile strength  
Elongation at break  
Permanent set at break  } ¹ D412  
100% modulus  
300% modulus  
500% modulus Shore D Hardness _____ D1484  
Trouser tear _____ ² D470

¹ Cross-head speed 20″/minutes.  
² Modified by use of 1.5″ x 3″ sample with 1.5″ cut on the long axis of the sample. This configuration avoids "necking down" of the sample at the point of tearing. Cross-head speed 50″/minute.

Inherent viscosities of the polymers in the following examples are measured at 30° C. at a concentration of 0.5 g./dcl. in a mixed solvent of 60 parts by volume of liquid phenol and 40 parts by volume 1,1,2-trichloroethane. Liquid phenol is a mixture of 90 parts by weight phenol and 10 parts by weight water.

The carboxyl groups content can be determined by dissolving the copolyester in cresol, adding water and chloroform, and titrating the solution with standardized ethanolic potassium hydroxide. The end point is determined by potentiometry.

Example 1

Polycarbodiimide A is mixed into Copolyesters C–1, C–2, and C–3 in the amounts tabulated below. The compounding is effected by milling on an oil heated rubber mill (oil temperature 185° C.) for 5 minutes. Seventy-five mil sheets are compression molded from the compositions at 230–245° C. for physical testing. Before testing, all samples are conditioned at 24° C. and 50% relative humidity. Properties of the compositions are tabulated below.

COPOLYESTER

|  | C-1* | C-2 | C-3 | Control |
|---|---|---|---|---|
| Starting material: |  |  |  |  |
| Inherent viscosity | 0.85 | 0.91 | 1.04 | 1.4 |
| COOH, eq./10⁶ g | 16.0 | 17.0 | 21.0 | 24.1 |
| Polycarbodiimide A, parts per 100 parts copolyester | 1.5 | 2.0 | 2.0 | -------- |
| Compositions of this invention: |  |  |  |  |
| Inherent viscosity | 1.21 | 1.39 | 1.58 | -------- |
| COOH, eq./10⁶ g | Nil | Nil | Nil | -------- |
| Physical properties at 25° C.: |  |  |  |  |
| 100% modulus, p.s.i | 2,310 | 2,100 | 2,100 | 2,100 |
| 300% modulus, p.s.i | 2,420 | 2,510 | 2,500 | 2,400 |
| 500% modulus, p.s.i | 3,175 | 3,820 | 3,820 | 3,475 |
| Tensile strength, p.s.i | 4,150 | 7,000 | 6,100 | 6,200 |
| Elongation at break, percent | 700 | 710 | 660 | 770 |
| Trouser tear, p.l.i | 270 | 393 | 430 | 365 |
| Shore D hardness | 53 | 57 | 57 | 53 |
| Compression set B, percent,** 22 hrs./70° C | 48 | 46 | 44 | 43 |
| Physical properties at 149° C.: |  |  |  |  |
| 100% modulus, p.s.i | 700 | 650 | 630 | 710 |
| 300% modulus, p.s.i | 980 | 1,110 | 1,080 | 1,070 |
| 500% modulus, p.s.i | 1,510 | 2,000 | 1,980 | 1,790 |
| Tensile strength, p.s.i | >2,005 | >2,590 | >2,555 | >2,430 |
| Elongation at break, percent | >650 | >600 | >580 | >620 |

*Prior to testing, the composition prepared from Copolyester C–1 is held at 100° C. for 20 hours.  
**Samples annealed for 16 hours at 100° C. before testing.

The Control copolyester is prepared by the same procedure used for Copolyesters C–1, C–2, and C–3, with the exception that polycondensation is continued for about 50 minutes to yield a polymer having an inherent viscosity of 1.4 directly. The properties of the C–2 and C–3 compositions containing the polycarbodiimide are quite similar to those of the Control. The composition based on Copolyester C–1, while not equivalent to the Control, has much better properties than the starting copolyester which has tensile and tear strengths of about 2500 p.s.i. and 155 p.l.i. respectively.

Example 2

About 1.5 parts of Polycarbodiimide A is milled with 100 parts of Copolyester B for about 10 minutes on an oil-heated rubber mill at 175° C. Properties are measured on films of 20 mil thickness which are prepared by compression molding at about 200° C. Properties of the original Copolyester B and that mixed with the polycarbodiimide are tabulated below.

|  | Original copolyester | Copolyester B plus Polycarbodiimide A |
|---|---|---|
| Tensile strength, p.s.i | 3,300 | 5,900 |
| Elongation at break, percent | 830 | 850 |
| Set at break, percent | 280 | 210 |
| 100% modulus, p.s.i | 1,100 | 1,120 |
| 300% modulus, p.s.i | 1,410 | 1,500 |

Example 3

Polycarbodiimide A is milled into Copolyester A in the quantities shown below. The procedure used for milling and preparing samples for test is substantially that described in Example 1. The effect of the polycarbodiimide on inherent viscosity and physical properties is shown in the following table.

| Sample | Control | 3-A | 3-B | 3-C |
|---|---|---|---|---|
| Copolyester A, parts | 100 | 100 | 100 | 100 |
| Polycarbodiimide A, parts | -------- | 0.25 | 0.50 | 1.0 |
| Inherent viscosity | 1.54 | 1.69 | 1.76 | 1.82 |
| Tensile strength, p.s.i | 4,600 | 5,700 | 6,550 | 6,200 |
| Elongation at break, percent | 800 | 840 | 820 | 735 |
| Permanent set at break, percent | 240 | 215 | 190 | 175 |
| 100% modulus, p.s.i | 950 | 950 | 915 | 950 |
| 300% modulus, p.s.i | 1,300 | 1,300 | 1,300 | 1,330 |
| 500% modulus, p.s.i | 1,700 | 1,760 | 1,810 | 1,880 |
| Trouser tear, p.l.i | 240 | 280 | 305 | 330 |

Substantial increases in tensile strength, 500% modulus and tear strength are obtained and parallel the increases in inherent viscosity as the concentration of polycarbodiimide is increased. After exposing it at 121° C. for one month, composition 3–C retains about 90% of its original tensile strength while the Control retains only 55% of its original tensile strength.

Example 4

Polycarbodiimide B is milled into Copolyester A in the proportions shown below using a steam-heated mill at 149–163° C. Fifty mil sheets are compression molded from the compositions at 177–190° C. A Control sample of copolyester A is treated by the same procedure including the milling step with the exception that no polycarbodiimide is added. Before testing, all samples are conditioned for 3 days at 24° C. and 50% relative humidity. Physical properties are tabulated below.

| Sample | Control | 4-A | 4-B |
|---|---|---|---|
| Copolyester A, parts | 100 | 100 | 100 |
| Polycarbodiimide B, parts |  | 1 | 2 |
| Properties: |  |  |  |
| Inherent viscosity | 1.45 | 1.56 | 1.53 |
| 100% modulus, p.s.i | 1,190 | 1,200 | 1,170 |
| 300% modulus, p.s.i | 1,480 | 1,530 | 1,460 |
| 500% modulus, p.s.i | 2,180 | 2,120 | 2,050 |
| Tensil strength, p.s.i | 5,750 | 7,050 | 7,050 |
| Elongation at break, percent | 810 | 805 | 780 |
| Trouser tear, p.l.i | 263 | 320 | 333 |

The compositions made by the process of this invention show significant increases in inherent viscosity, tensile strength, and tear strength over the Control. After immersion in boiling water for 30 days, compositions 4-A and 4-B of this invention retain 85–90% of their original tensile strength while the Control retains only about 15% of its original tensile strength.

What is claimed is:

1. A process for preparing an improved thermoplastic elastomeric copolyester composition consisting essentially of comingling and reacting (1) about 0.1–5.0 percent by weight of the thermoplastic composition of at least one polycarbodiimide selected from substantually linear polycarbodiimides represented by the formula

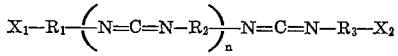

where $R_1$, $R_2$, and $R_3$ are $C_1$–$C_{12}$ aliphatic, $C_5$–$C_{15}$ cycloaliphatic, or $C_6$–$C_{15}$ aromatic divalent hydrocarbon radicals, and combinations thereof; $X_1$ and $X_2$ are hydrogen,

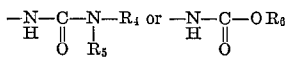

where $R_4$, $R_5$, and $R_6$ are $C_1$–$C_{12}$ aliphatic, $C_5$–$C_{15}$ cycloaliphatic, and $C_6$–$C_{15}$ aromatic monovalent hydrocarbon radicals and combinations thereof, and additionally $R_4$ or $R_5$ can be hydrogen; and $n$ is a number of at least one, with (2) at least one segmented copolyester polymer consisting essentially of recurring intralinear long chain ester units and short chain ester units randomly joined head-to-tail through ester linkages, said long chain ester units being represented by the formula

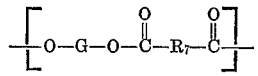

and said short chain ester units being represented by the formula

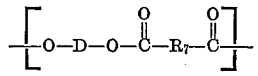

where G is a divalent radical remaining after the removal of terminal hydroxyl groups from at least one long chain glycol having a molecular weight of about 400–6000; $R_7$ is a divalent radical remaining after removal of carboxyl groups from at least one dicarboxylic acid having a molecular weight less than about 300; and D is a divalent radical remaining after removal of hydroxyl groups from at least one low molecular weight diol having a molecular weight less than 250, with proviso that said copolyester polymer has an inherent viscosity of 0.75 to 1.7.

2. The process of Claim 1 in which the polycarbodiimide is about 0.2–3.0 percent by weight of the thermoplastic composition.

3. The process of Claim 1 in which $n$ is 1–7.

4. The process of Claim 1 in which said segmented polyester polymer has an inherent viscosity of about 1.0–1.3.

5. The process of Claim 1 in which the short chain ester units are characterized in that a polymer formed from said short chain ester units has a melting point of at least 150° C.

6. The process of Claim 1 in which G is a divalent radical remaining after the removal of terminal hydroxyl groups from a long chain glycol having a melting point of less than about 60° C.

7. The process of Claim 1 in which the long chain glycol is selected from poly(alkylene oxide)glycols wherein the alkylene group has 2–9 carbon atoms.

8. The process of Claim 7 in which the long chain glycol is selected from poly(ethylene oxide)glycol,
poly(1,2- and 1,3-propylene)oxide glycol,
poly(tetramethylene oxide)glycol,
poly(pentamethylene oxide)glycol,
poly(hexamethylene oxide)glycol,
poly(heptamethylene oxide)glycol,
poly(octamethylene oxide)glycol,
poly(nonamethylene oxide)glycol, and
poly(1,2-butylene oxide)glycol.

9. The process of Claim 1 in which the polycarbodiimides are aromatic.

10. The process of Claim 1 in which the polycarbodiimide is an unhindered aromatic polycarbodiimide, a hindered aromatic polycarbodiimide, and combinations thereof.

11. The process of Claim 1 in which the polycarbodiimide is a hindered aromatic polycarbodiimide.

12. The process of Claim 1 in which the polycarbodiimide is an unhindered aromatic polycarbodiimide.

References Cited

UNITED STATES PATENTS 3,193,522   7/1965   Neumann et al.   260—45.9

FOREIGN PATENTS 3,168   11/1969   Republic of South Africa.
6907958   11/1969   Netherlands.

MELVIN GOLDSTEIN, Primary Examiner

U.S. Cl. X.R.

260—45.9 R, 75 T